US007066692B2

(12) United States Patent
Kuhn

(10) Patent No.: US 7,066,692 B2
(45) Date of Patent: Jun. 27, 2006

(54) DUAL CHUCK ELECTRICAL HAND DRILL

(76) Inventor: Jayme K. Kuhn, 4060 Route 20, Durham, NY (US) 12422

( * ) Notice: Subject to any disclaimer, the term of this patent is extended or adjusted under 35 U.S.C. 154(b) by 476 days.

(21) Appl. No.: 10/346,237

(22) Filed: Jan. 16, 2003

(65) Prior Publication Data

US 2004/0141818 A1 Jul. 22, 2004

(51) Int. Cl.
*B23B 45/00* (2006.01)

(52) U.S. Cl. .................... 408/124; 408/42; 408/241 G; 173/29; 173/216

(58) Field of Classification Search .................. 408/35, 408/36, 42, 124, 241 G, 710; 173/29, 216; 310/47, 50

See application file for complete search history.

(56) References Cited

U.S. PATENT DOCUMENTS

| | | | | |
|---|---|---|---|---|
| 3,579,002 | A * | 5/1971 | Wickham | 310/50 |
| 3,781,579 | A * | 12/1973 | Rosenthal et al. | 310/68 A |
| 3,783,955 | A * | 1/1974 | Gill | 173/50 |
| 4,136,592 | A | 1/1979 | Beatty | |
| 4,413,937 | A | 11/1983 | Gutsche | |
| 4,512,693 | A | 4/1985 | Swanson | |
| 4,514,117 | A | 4/1985 | Scott | |
| 4,573,839 | A | 3/1986 | Finnegan | |
| 4,596,067 | A | 6/1986 | Raiteri | |
| 4,669,932 | A * | 6/1987 | Hartley | 408/239 R |
| 4,676,703 | A | 6/1987 | Swanson | |
| 4,678,378 | A | 7/1987 | Koczarski | |
| 5,149,230 | A * | 9/1992 | Nett | 408/42 |
| 5,222,848 | A | 6/1993 | Kuang-Wu | |
| 5,276,929 | A * | 1/1994 | Mitchell | 7/158 |
| 5,540,292 | A | 7/1996 | Behrens | |
| 5,651,647 | A | 7/1997 | Ray | |
| 5,882,286 | A | 3/1999 | Aufiero | |
| 6,099,212 | A | 8/2000 | Marocco | |
| 6,231,279 | B1 | 5/2001 | Aufiero | |
| 6,361,254 | B1 | 3/2002 | Vesterlund et al. | |
| 6,506,002 | B1 * | 1/2003 | Cummins | 408/35 |
| 6,715,969 | B1 * | 4/2004 | Eriksen | 408/35 |

FOREIGN PATENT DOCUMENTS

| | | | |
|---|---|---|---|
| DE | 3702498 | A1 * | 10/1987 |
| DE | 4334406 | A1 * | 4/1995 |
| EP | 195264 | A2 * | 9/1986 |
| WO | WO 2004105986 | A1 * | 12/2004 |

* cited by examiner

*Primary Examiner*—Boyer D. Ashley
*Assistant Examiner*—Ali Abdelwahed
(74) *Attorney, Agent, or Firm*—Schmeiser, Olsen & Watts

(57) ABSTRACT

A drill comprising: a power head having a first chuck positioned on a first end and a second chuck positioned on an opposite second end of the power head; a handle attached to the power head, the handle having a trigger switch for controlling a drive motor coupled to the first and second chucks.

29 Claims, 6 Drawing Sheets

DUAL CHUCK ELECTRICAL HAND DRILL

FIELD OF THE INVENTION

The present invention relates to the field of electrical hand drills; more specifically, it relates to an electrically powered hand drill having two oppositely facing chucks.

BACKGROUND OF THE INVENTION

An ongoing need in the woodworking industry is to drill pilot holes before driving screws into materials. This has been traditionally accomplished by the use of two separate tools, namely a drill for drilling the pilot holes, and a screwdriver (which may be a hand tool, a powered tool, or another drill) for driving the screws. Use of two tools, requires repeatedly laying down the first tool and picking up the second tool. Under many circumstances, such as working from ladders, this can be very awkward. Recently, adapters have been developed that allow a double ended bit, for example a drill bit and a screw driver bit to be releasably held in an adapter held in the chuck. While this a eliminated the need for switching between two tools, there is still the need to release, remove, turn, and reinsert the dual ended bit. Not only is this time consuming, but the user may drop the dual ended bit. Further, the adapter increases the overall distance from the chuck to the tip of the bit, which can be awkward in tight spaces.

The above discussion is equally applicable for the case where large diameter holes are drilled, wherein a pilot hole is drilled for a larger drill.

Therefore, there is still is a need for a means for drilling and driving screws with a single tool.

SUMMARY OF THE INVENTION

A first aspect of the present invention a drill comprising: a power head having a first chuck positioned on a first end and a second chuck positioned on an opposite second end of the power head; a handle attached to the power head, the handle having a trigger switch for controlling a drive motor coupled to the first and second chucks.

A second aspect of the present invention is a drill comprising: a power head having a first chuck positioned on a first end and a second chuck positioned on an opposite second end of the power head; a handle attached to the power head, the handle having a first trigger switch on a first side of the handle and a second trigger switch on an opposite second side of the handle, the first and second trigger switches controlling a drive motor coupled to the first and second chucks; and a selector switch, the selector switch for either enabling the first trigger switch and disabling the second trigger switch or for enabling the second trigger switch and disabling the first trigger switch.

A third aspect of the present invention is a drill comprising: a power head extending along a longitudinal axis, the power head having a first chuck positioned on a first end and a second chuck positioned on an opposite second end of the power head; a handle extending along a direction substantially perpendicular to the longitudinal axis, the handle attached to the power head, the handle having a first trigger switch on a first side of the handle adjacent to the first chuck and a second trigger switch on an opposite second side of the handle adjacent to the second chuck, the first and second trigger switches controlling a drive motor mounted in the power head and coupled to the first and second chucks; and a selector switch having a first position for enabling the first trigger switch and disabling the second trigger switch and a second position for enabling the second trigger switch and disabling the first trigger switch.

BRIEF DESCRIPTION OF DRAWINGS

The features of the invention are set forth in the appended claims. The invention itself, however, will be best understood by reference to the following detailed description of an illustrative embodiment when read in conjunction with the accompanying drawings, wherein:

DETAILED DESCRIPTION OF THE INVENTION

Figures 1, 1A:
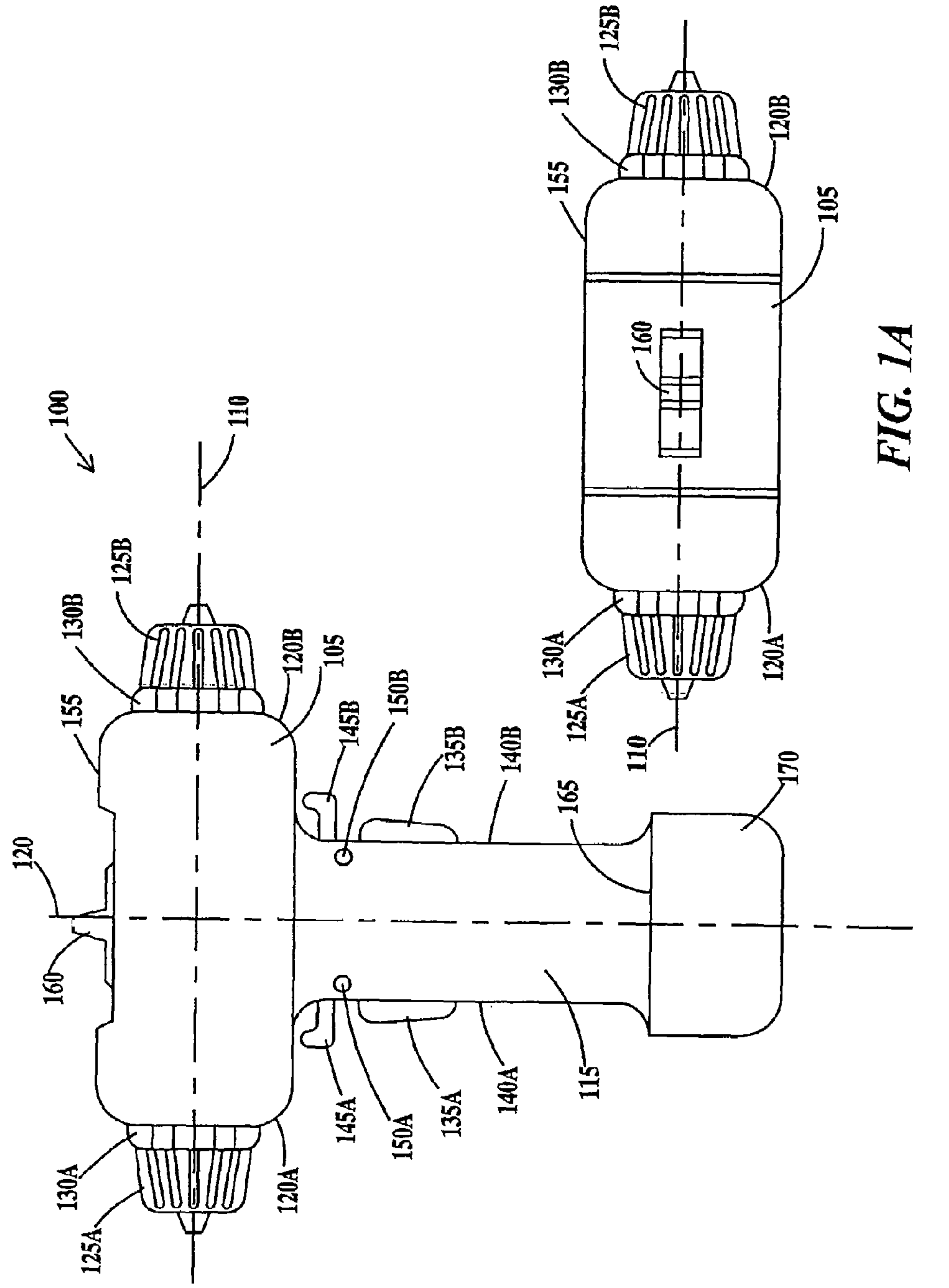
FIG. 1 a side view of a hand drill according to the present invention.
FIG. 1A is a top view of the hand drill illustrated in FIG. 1.

FIG. 1 a side view and FIG. 1A is a top view of a hand drill 100 according to the present invention. Hand drill 100 includes a power head 105 extending along a longitudinal axis 110 and a handle 115 extending along an axis 120 perpendicular to longitudinal axis 110. Longitudinal axis 110 defines the horizontal direction and axis 120 defines the vertical direction. Extending from opposite ends 120A and 120B of power head 105 are first and second chucks 125A and 125B. First and second chucks 125A and 125B include variable torque control rings 130A and 130B respectively.

Handle 115 includes first and second trigger switches 135A and 135B positioned on opposite sides 140A and 140B of handle 115. First and second trigger switches 135A and 135B are illustrated as spring loaded push switches but other types of switches, such as lever switches may be substituted. First trigger switch 135A controls the speed of rotation of first chuck 125A when the first chuck is selected or active and second trigger switch 135B controls the speed of rotation of second chuck 125B when the second chuck is selected or active. First and second trigger switches 135A and 135B may be connected to single speed, multiple speed or variable speed controls. Located immediately above first trigger switch 135A is a first reverse switch 145A and located immediately above second trigger switch 135B is a second reverse switch 145B. First reverse switch 135A controls the direction of rotation of first chuck 125A when the first chuck is selected or active and second reverse switch 135B controls the direction of rotation of second chuck 125B when the second chuck is selected or active. First and second reverse switches 145A and 145B are illustrated as lever switches movable in and out of the plane of the drawing. First and second trigger switches 135A and 135B may include optional locking buttons 150A and 150B respectively for locking the position of each trigger switch.

Figure 2:
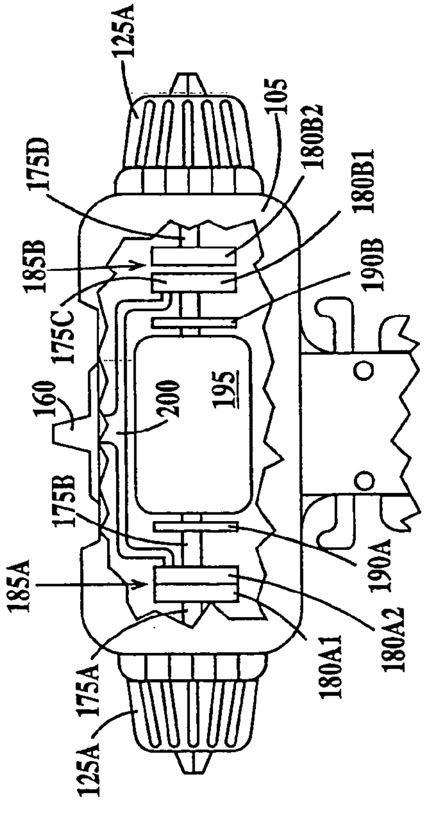
FIG. 2 is a cutaway partial side view of the hand drill illustrated in FIG. 1.
Figure 3:
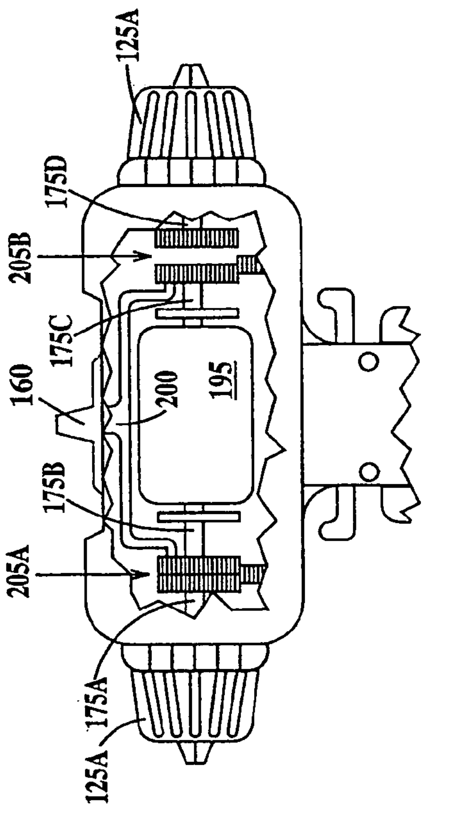
FIG. 3 is a cutaway partial side view of the hand drill illustrated in FIG. 1.

Located on a top surface 155 of power head 105 is a selector switch 160. Selector switch 160 is illustrated as a slide switch, slidable parallel to longitudinal axis 110. Selector switch 160 performs several functions. The overall function of selector switch 160 is to enable first trigger switch 135A and first reverse switch 145A and disable second trigger switch 135B and second reverse switch 145B or to disable first trigger switch 135A and first reverse switch 145A and enable second trigger switch 135B and second reverse switch 145B. Only one of first and second trigger switches 135A and 135B can be enabled at a time and only one of first and second reverse switches 145A and 145B can be enabled at the same time. When first trigger switch 135A is enabled or disabled, first reverse switch 145A is correspondingly enabled or disabled. When second trigger switch 135B is enabled or disabled, second reverse switch 145B is correspondingly enabled or disabled. Selector switch 160 may also have the optional function of selectively and mutually exclusively coupling and decoupling first and second chucks 125A and 125B from a drive motor (not illustrated in FIG. 1) in correspondence to the activation and deactivation of first and second trigger switches 135A and 135B. This function is illustrated in FIG. 2 and described infra. Selector switch 160 may also have the optional function of reversing the previous direction of rotation of the drive motor (not illustrated in FIG. 1) in correspondence to the activation and deactivation of first and second trigger switches 135A and 135B. This function is illustrated in FIG. 3 and described infra. Selector switch 160 is illustrated in the position (relative to axis 120) for selecting first chuck 125A and activating first trigger switch 135A and first reversing switch 145A.

Positioned on a lower portion 165 of handle 115 is a battery 170 for supplying electrical power to drill 100. The voltage of battery 170 may be 3.6, 7.2, 9.6, 14.4, 18, 24, 36 volts or any other suitable voltage. Battery 170 may be replaced with an AC power cord with appropriate changes to the control circuits and motor of drill 100. For an AC corded drill, a transformer/rectifier may be used to convert AC to DC power. First and second chuck 125A and 125B are illustrated as keyless chucks. Keyed chucks may be substituted.

FIG. 2 is a cutaway partial side view of hand drill 100 illustrated in FIG. 1. In FIG. 2, first chuck 125A is coupled to a drive shaft 175A, which in turn is coupled to a first clutch plate 180A1 of a first clutch 185A. A drive shaft 175B couples a second clutch plate 180A2 of the first clutch through a first thrust bearing 190A to a motor assembly 195. Motor assembly 195 contains a motor and any reduction gears required to reduce the speed of the motor. Second chuck 125B is coupled to a drive shaft 175C, which in turn is coupled to a second clutch plate 180B1 of a second clutch 185B. A drive shaft 175D couples a second clutch plate 180B2 of the second clutch through a second thrust bearing 190B to motor assembly 195. Control arm 200 engages first clutch 185A and disengages second clutch 185B or disengages first clutch 185A and engages second clutch 185B. First and second clutches 185A and 185B may comprise frictional plates as illustrated or utilize control of a fluid between non-contacting plates. Alternatively, first and second chucks 125A and 125B may be engaged and disengaged from motor assembly 195 by sliding gears as illustrated in FIG. 3 and described infra. It should be noted, that disengaging the non-selected chuck is optional, and shaft 175A and 175B may be directly and fixedly coupled and shaft 175C and 175D may be directly and fixedly coupled. The entire clutch mechanisms including splines and springs are not illustrated.

FIG. 3 is a cutaway partial side view of the hand drill illustrated in FIG. 1. In FIG. 3, first chuck 125A is coupled to drive shaft 175A, which in turn is coupled to a first set of slidable gears 205A. Drive shaft 175B couples first set of gears 205A through first thrust bearing 190A to motor assembly 195. Second chuck 125B is coupled to drive shaft 175C, which in turn is coupled to a second set of slidable gears 205B. Drive shaft 175D couples second set of gears 205B through second thrust bearing 190B to motor assembly 195. Control arm 200 engages first set of gears 205A and disengages second set of gears 205B or disengages first set of gears 205A and engages second set of gears 205B. The entire gear mechanisms including splines and springs are not illustrated.

Figure 4:
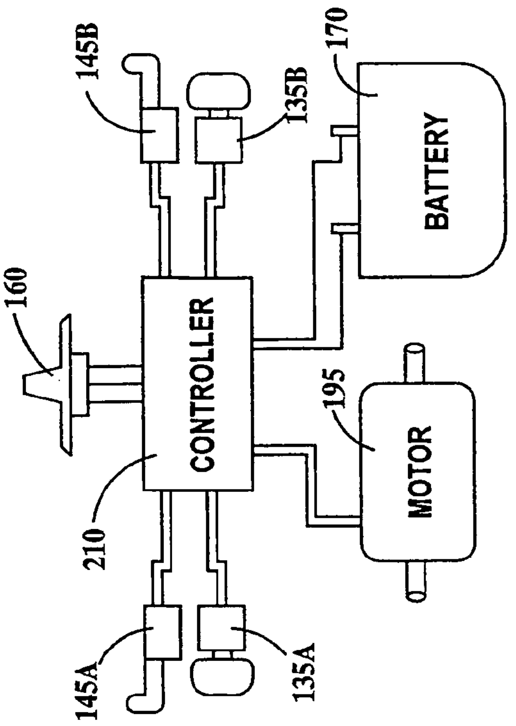
FIG. 4 is a electrical schematic diagram of the hand drill of FIG. 1.

FIG. 4 is a electrical schematic diagram of hand drill 100 of FIG. 1. Because first and second chucks 125A and 125B will rotate in opposite directions for a given direction of rotation of motor assembly 195 (see FIG. 2) it may be desirable to incorporate means within drill 100 so that when a change in chuck selection is made, motor assembly will automatically be switched to rotate in the opposite direction. FIG. 4 illustrates an all-electronic method of changing the rotation direction of motor assembly in response to chuck selection. A mechanical method of adjusting rotation direction is illustrated in FIG. 12 and described infra. In FIG. 4, First and second trigger switches 135A and 135B, first and second reverse switches 145A and 145B, selector switch 160, battery 170 and motor assembly 195 are all connected to a solid-state controller 210. Controller 210 senses the position of selector switch 160 (via a three wire connection) and switches the polarity of the connections made between battery 170 and motor assembly 195 by first and second trigger switches 135A and 135B and first and second reverse switches 145A and 145B accordingly.

Figure 5:
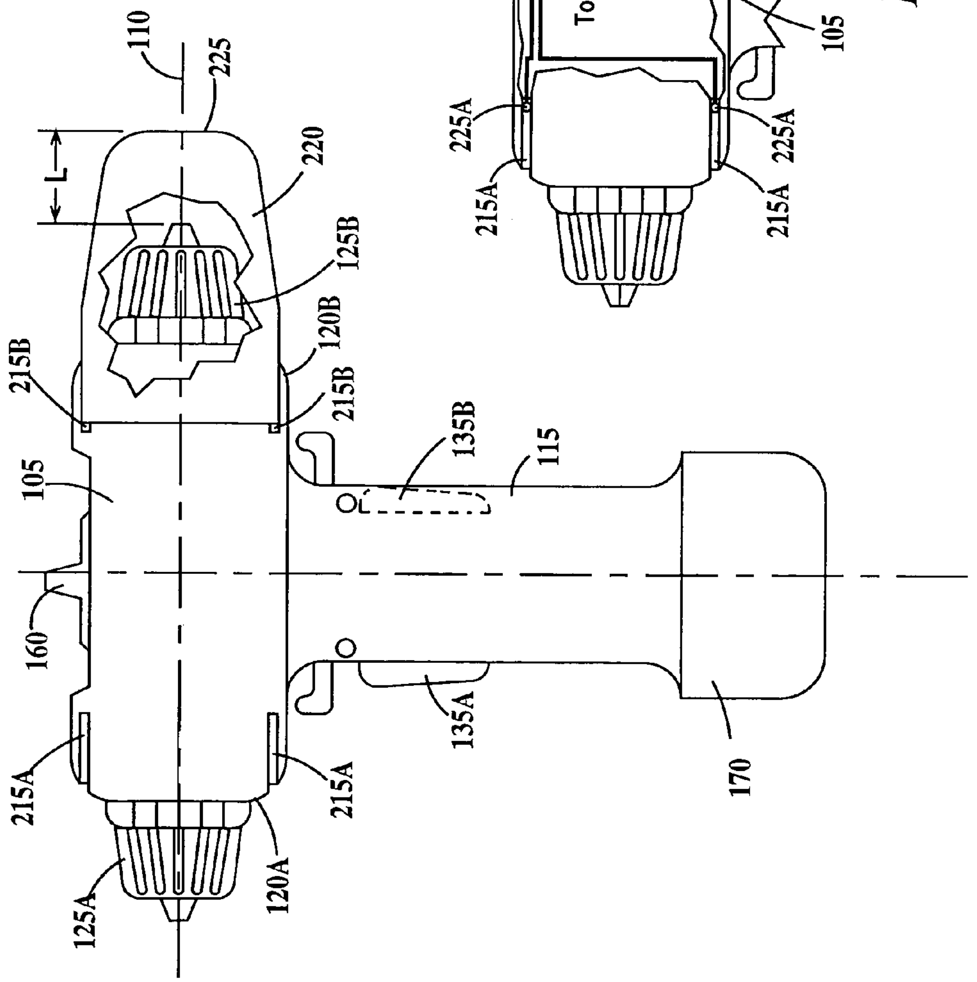
FIG. 5 is a cutaway side view of the hand drill of FIG. 1 adapted for a first type of protective chuck cap.

FIG. 5 is a cutaway side view of the hand drill of FIG. 1 adapted for a first type of protective chuck cap. In FIG. 5, formed in power head 105 are a first set of horizontal slots 215A located in first end 120A of power head 105 and a second set of horizontal slots 215B located in second end 120B of power head 105. First and second slots 215A and 215B are identical. Only two first slots 215A and two second slots 215B are illustrated, Two additional first slots 215A and two additional second slots 215B are located on the opposite side of power head 105 from the side illustrated in FIG. 5. Protective cap 220 is adapted to slidably and frictionally engage first and second slots 215A and 215B and thus cover the unselected or inactive chuck. Since selector switch 160 is selecting first chuck 125A, protective cover 220 is positioned in second slots 215B over second chuck 125B. When second chuck 125B is selected, protective cover 220 may be engaged in first slots 215A and cover first chuck 125A. An end 225 of protective cover 220 extends a distance "L" from the end of chuck 125B (or 125A) in order to cover any tool bit in the chuck. More than one cover may be supplied and the covers may have different lengths (including "L=0") to accommodate different length tool bits or simply to protect the chuck(s) when not selected. Protective cap 220 may be attached to drill 100 by a lanyard to prevent loss of the protective cap.

Figure 6:
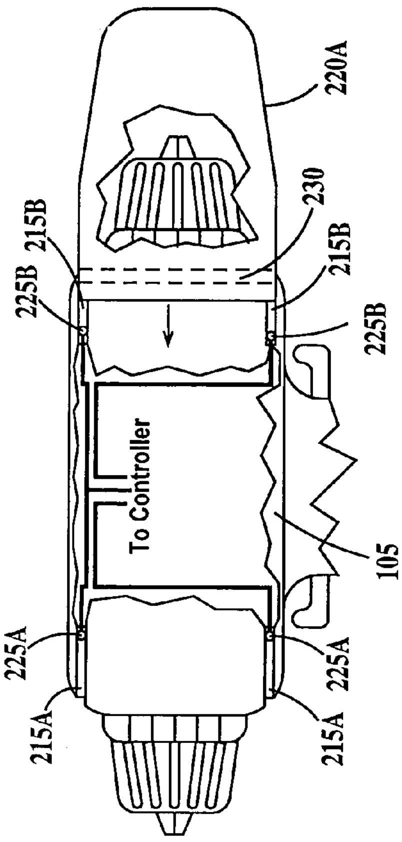
FIG. 6 is cutaway partial side view of the hand drill of FIG. 1 adapted for a second type of protective chuck cover.

FIG. 6 is cutaway partial side view of the hand drill of FIG. 1 adapted for a second type of protective chuck cover. FIG. 6 differs from FIG. 5 in that at least two first slots 215A and at least two second slots 215B are fitted with electrical contacts 225A and 225B respectively and in that protective cap 220A is fitted with an electrically conductive internal contact ring 230 adapted to electrically connect either first contacts 225A or second contacts 225B when the cap is in place. Electrical contacts 225A and 225B are coupled to controller 210 (see FIG. 4) in place of selector switch 160 (see FIG. 4). This arrangement eliminates the need for selector switch 160 (see FIG. 4) unless only the mechanical aspect of engaging and disengaging first and second chucks 125A and 125B from motor assembly 195 (as illustrated in FIGS. 2 and 3 and describe supra) is desired, in which case selector switch 160 has no electrical function. In this configuration, controller 210 (see FIG. 4) may have a safety lockout function, such that the drill is inoperative unless protective cap 220A is in place in either first slots 215A or second slots 215B. Protective cap 220A may be attached to drill 100 by a lanyard to prevent loss of the protective cap.

Figure 7A:
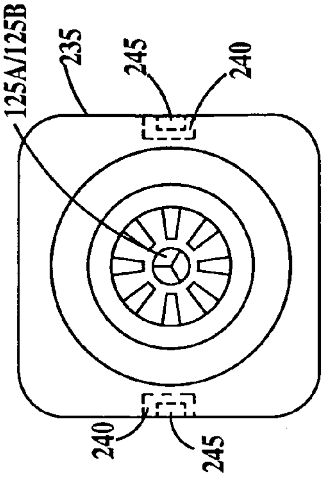
FIG. 7A is and end view of the hand drill illustrated in FIG. 7.
Figure 7:
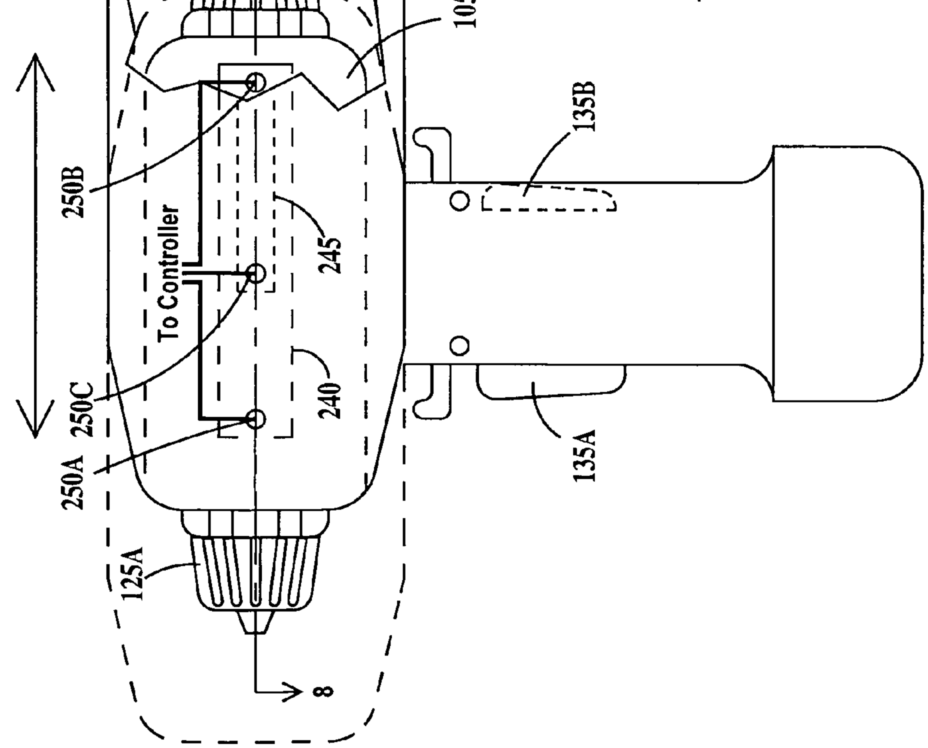
FIG. 7 is a cutaway side view of the hand drill of FIG. 1, adapted for a third type of protective chuck cover.

FIG. 7 is a cutaway side view and FIG. 7A is an end view of the hand drill of FIG. 1, adapted for a third type of protective chuck cover. In FIG. 7, a non-removable protective cap 235 is mounted on power head 105 via slots 240 that electrically conductive bars 245 slidably engage. Slots 240 are fitted with first contacts 250A, second contacts 250B and center contacts 250C, which are coupled to controller 210 (see FIG. 4). Cover 235 slides in the horizontal direction.

When cover 235 is shifted to fully expose first chuck 125A and cover second chuck 125B, center contact 250C and second contact 250B are electrically coupled. When cover 235 is shifted to fully expose second chuck 125B and cover first chuck 125A, center contact 250C and first contact 250A are electrically coupled. Electrical contacts 250A, 250B and 250C are coupled controller 210 (see FIG. 4) in place of selector switch 160 (see FIG. 4). In FIG. 7, cover 235 is illustrated fully positioned over second chuck 125B with first chuck 125A completely exposed and operable, second chuck 125B is inoperable. The dashed lines indicate the position of cover 235 partially shifted to partially expose second chuck 125A and cover first chuck 125A. In the position indicated by the dashed lines, neither first chuck 125A nor second chuck 125B is operable. In this configuration, controller 210 (see FIG. 4) has a safety lockout function, such that the drill is inoperative unless protective cap 235 is fully shifted toward either first chuck 125A or second chuck 125B.

The arrangement of cover 235 and contacts 150A, 250B and 250C eliminates the need for selector switch 160 (see FIG. 4) unless only the mechanical aspect of engaging and disengaging first and second chucks 125A and 125B from motor assembly 195 (as illustrated in FIGS. 2 and 3 and describe supra) is desired, in which case selector switch 160 has no electrical function.

Cover 235 may be mechanically linked to first and second trigger switches 135A and 135B in a manner that retracts first trigger switch 125A into handle when first chuck 130A is covered by cover 235 and retracts second trigger switch 135B into handle 115 when second chuck 130B is covered by cover 235. By retracting first and second trigger switches 135A and 135B into handle 115, contacts 140A, 250B and 250C may be, but do not need to be, eliminated since the retracted switch can no longer be depressed by the user. Retraction of the unused switch produces a better feel in the users hand.

Figure 8B:
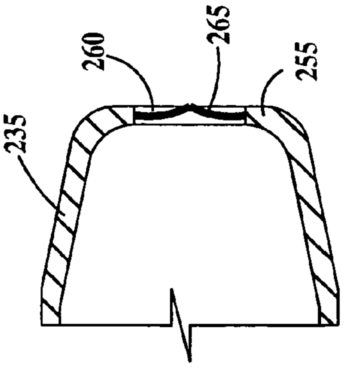
FIG. 8B is a section through 8—8 of FIG. 6 illustrating an alternative arrangement of the protective chuck cover.
Figure 8A:
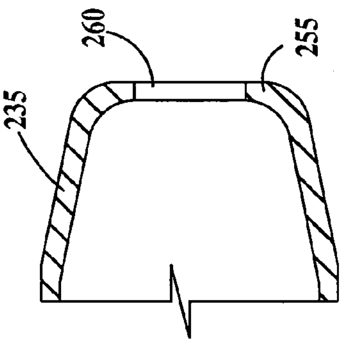
FIG. 8A is a section through 8—8 of FIG. 7.

FIG. 8A is a section through 8—8 of FIG. 7. In FIG. 8A, opposite ends 255 (only one illustrated) of cover 235 include openings 260. Opening 260 is sized to allow chuck 125A (or 125B) and variable torque control ring 130A (or 130B) (see FIG. 1) to be exposed when the cover is fully slid back and away from the selected chuck.

FIG. 8B is a section through 8—8 of FIG. 7 illustrating an alternative arrangement of the protective chuck cover. FIG. 8B is similar to FIG. 8A except that opening 260 is fitted with a rubber or flexible plastic iris that seals the opening over the unselected chuck.

Figure 9A:
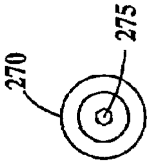
FIG. 9A is and end view of the alternative chuck illustrated in FIG. 9.
Figure 9:
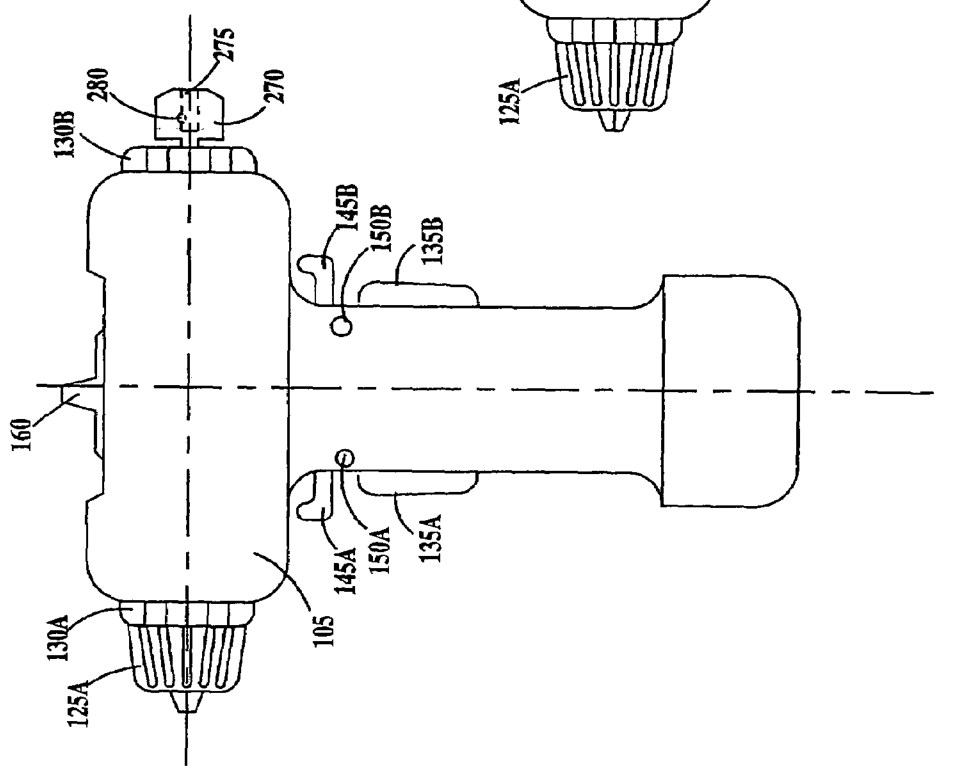
FIG. 9 is side view of the hand drill of FIG. 1 illustrating an alternative combination of chucks.

FIG. 9 is side view and FIG. 9A is an end view of the hand drill of FIG. 1 illustrating an alternative combination of chucks. FIG. 9 is similar to FIG. 1, except chuck 125B has been replaced by a bit holder 270. Bit holder 270 includes a hexagonal bore 275 and a ball 280 embedded in a wall of the bore. Other non-chucking bit holders may be substituted and various locking mechanisms may be added to holder 270 as is well known in the art. Bit holder 270 is designed to hold a tool bit such as that illustrated in FIG. 10 and describe infra.

Figure 10:
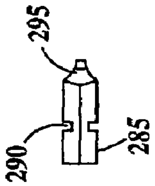
FIG. 10 is a side view of a tool bit adapted for use in the alternative chuck illustrated in FIGS. 9 and 9A

FIG. 10 is a side view of a tool bit adapted for use in the alternative chuck illustrated in FIGS. 9 and 9A. In FIG. 10, tool bit 285 includes an annular slot 290 for removably engaging ball 280 of bore 275 (see FIG. 9). Bit end 295 of tool bit 285 may be a drill, a mill head, a file or a screw or nut driver head.

Figure 11:
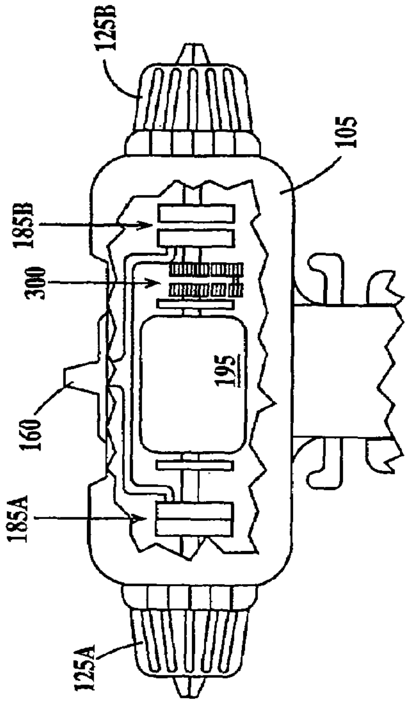
FIG. 11 is a cutaway partial side view of the hand drill if the present invention illustrating an alternative method of chuck rotation directional control.

FIG. 11 is a cutaway partial side view of the hand drill if the present invention illustrating an alternative method of chuck rotation directional control. FIG. 11 is similar to FIG. 2 except a set of reversing gears 300 have been added between second clutch 185B and motor assembly 195. Gears 300 eliminate the need for controller 210 (see FIG. 4) having to change the direction of rotation of motor assembly 195 as a function of whether first chuck 125A or second chuck 125B is selected. It should be noted that in FIG. 3, second set of gears 205B may be reversing gears.

Figure 12A:
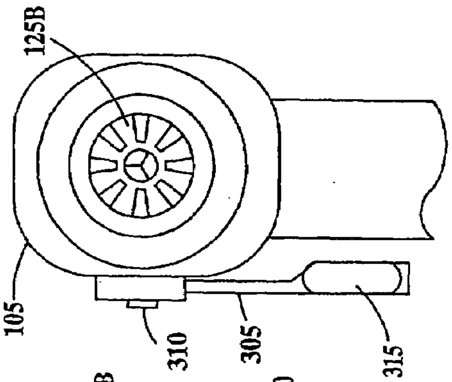
FIG. 12A is an end view of the hand drill illustrated in FIG. 12.
Figure 12B:
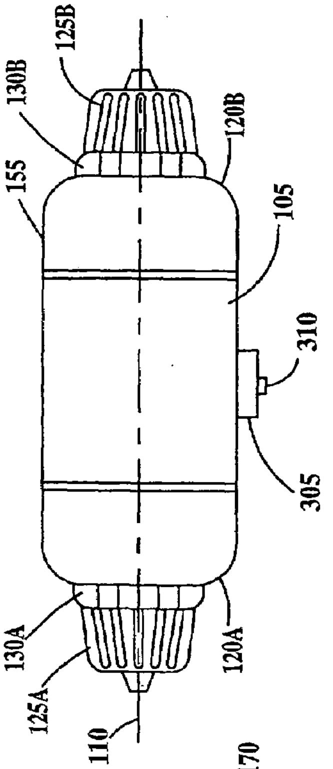
FIG. 12B is a side view of the hand drill illustrated in FIG. 12.
Figure 12:
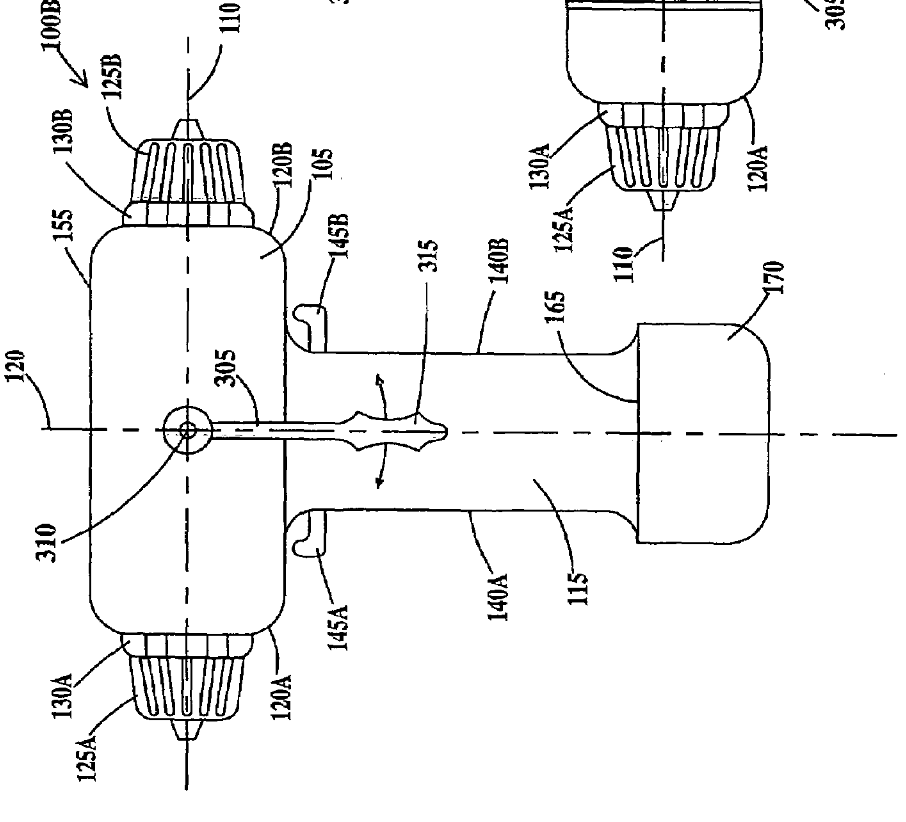
FIG. 12 a side view of a hand drill according to a second embodiment of the present invention.

FIG. 12 a side view, FIG. 12A is and end view and FIG. 12B is a side view of a hand drill according to a second embodiment of the present invention. FIG. 12 differs from FIG. 1 in that drill 100B has only a single trigger switch 305 that controls both first and second chucks 125A and 125B. Trigger switch 305 us attached to power head 105 by a pivot 310 and a trigger end 315 is free to swing in an arc towards first chuck 125A or toward second chuck 125B. Trigger switch 305 may be activated by a users index finger or thumb depending upon which chuck is to be activated. Trigger switch 305 is spring loaded so it always returns to an "off" position aligned with axis 120. The selector switch (selector switch 160 in FIG. 1) is included in trigger switch 305.

The description of the embodiments of the present invention is given above for the understanding of the present invention. It will be understood that the invention is not limited to the particular embodiments described herein, but is capable of various modifications, rearrangements and substitutions as will now become apparent to those skilled in the art without departing from the scope of the invention. For example, the present invention may be adapted to pneumatic hand drills, that is hand drills powered by compressed air or other gases. Therefore, it is intended that the following claims cover all such modifications and changes as fall within the true spirit and scope of the invention.

What is claimed is:

1. A drill comprising:

a power head having a first chuck positioned on a first end and a second chuck positioned on an opposite second end of said power head;

a handle attached to said power head, said handle having a first trigger switch on a first side of said handle and a second trigger switch on an opposite second side of said handle, said first and second trigger switches controlling a drive motor coupled to said first and second chucks; and a selector switch, said selector switch for either enabling said first trigger switch and disabling said second trigger switch or for enabling said second trigger switch and disabling said first trigger switch;

a protective cover slidably mounted to said power head, said protective cover exposing said second chuck and covering said first chuck when slid to a first end position and said protective cover exposing said first chuck and covering said second chuck when slid to a second and opposite end position; and wherein said protective cover is operable to retract said first trigger switch into said handle when said protective cover is slid to said first end position and to retract said second trigger switch into said handle when slid to said second end position.

2. The drill of claim 1 wherein said selector switch is operable for either coupling said drive motor to said first chuck and decoupling said second chuck from said drive motor or for coupling said drive motor to said second chuck and decoupling said first chuck from said drive motor.

3. The drill of claim 1 wherein said selector switch is operable for causing said first chuck to rotate in a first direction and said second chuck to rotate in a second opposite direction relative to the direction of rotation of said first chuck.

4. The drill of claim 1 further comprising reversing gears coupled between said drive motor and said second chuck.

5. The drill of claim 1 further comprising a first reversing switch on said first side of said handle and a second reversing switch on said opposite second side of said handle, said first and second reversing switches reversing the direction of rotation of said drive motor, said first and second reversing switches enabled or disabled by said selector switch in conjunction with the enabling or disabling of said first and second trigger switches respectively.

6. The drill of claim 1, wherein said protective cover is detachably mountable to said first or said second end of said power head, said protective cover is at least of sufficient length to cover said first and second chucks.

7. The drill of claim 6, wherein said selector switch comprises at least two electrical contacts in said first end of said power head and at least two contacts in said second end of said power head, said contacts in said first end of said power head electrically connectable by a conductive element in said protective cover when said protective cap is positioned on said first end of said power head and said contacts in said second end of said power head electrically connectable by a conductive element in said protective cap when said protective cover is positioned on said second end of said power head.

8. The drill of claim 1, wherein said selector switch comprises first end, center and second end contacts in said power head, said contacts disposed on said power head and wherein said first end contact and said center contact are electrically connectable by a conductive element in said protective cap when said protective cover is slid to said first end position and second end contact and said center contact are electrically connectable by a conductive element in said protective cover when said protective cap is slid to said second end position.

9. The drill of claim 1, wherein said first chuck and said second chuck are selected from the group consisting of keyed chucks, keyless chucks and chuckless bit holders.

10. The drill of claim 1, wherein said drive motor is supplied by a battery mounted in said handle or from a power cord connectable to an external power supply.

11. The drill of claim 1, further including first trigger position locking means on a first side of said handle and second trigger position locking means on an opposite second side of said handle, said first trigger position locking means locking the position of said first trigger switch and said second trigger position locking means locking the position of said second trigger switch.

12. A drill comprising:

a power head extending along a longitudinal axis, said power head having a first chuck positioned on a first end and a second chuck positioned on an opposite second end of said power head;

a handle extending along a direction substantially perpendicular to said longitudinal axis, said handle attached to said power head, said handle having a first trigger switch on a first side of said handle adjacent to said first chuck and a second trigger switch on an opposite second side of said handle adjacent to said second chuck, said first and second trigger switches controlling a drive motor mounted in said power head and coupled to said first and second chucks;

a selector switch having a first position for enabling said first trigger switch and disabling said second trigger switch and a second position for enabling said second trigger switch and disabling said first trigger switch; and a protective cover slidably mounted to said power head, said protective cover slidable along said longitudinal axis between a first end position and an opposite second end position, said protective cover is at least of sufficient length to expose said second chuck and cover said first chuck when slid to a first end position and said protective cover is at least of sufficient length to expose said first chuck and cover said second chuck when slid to a second end position, wherein said protective cover is operable to retract said first trigger switch into said handle when said protective cover is slid to said first end position and to retract said second trigger switch into said handle when slid to said second end position.

13. The drill of claim 12 further including means for coupling said first chuck to said drive motor and decoupling said second chuck from said drive motor when said selector switch is in said first position and for coupling said second chuck to said drive motor and decoupling said first chuck from said drive motor when said selector switch is in said second position.

14. The drill of claim 13, wherein said coupling and decoupling means is a first clutch coupled between said first chuck and said drive motor and a second clutch coupled between said second chuck and said drive motor or a first set of engageable gears between said first chuck and said drive motor and a second set of gears between said second chuck and said drive motor.

15. The drill of claim 12, further including rotation direction change means for causing said first chuck to rotate in a first direction and said second chuck to rotate in a second opposite direction relative to the direction of rotation of said first chuck.

16. The drill of claim 15, wherein said rotation direction change means comprises reversing gears coupled between said drive motor and said second chuck.

17. The drill of claim 15, wherein said rotation direction change means includes a solid-state controller.

18. The drill of claim 17, wherein said solid-state controller is controllable by said selector switch.

19. The drill of claim 12, further comprising a first reversing switch on said first side of said handle and a second reversing switch on said opposite second side of said handle, said first and second reversing switches reversing the direction of rotation of said drive motor, said first and second reversing switches enabled or disabled by said selector switch in conjunction with the enabling or disabling of said first and second trigger switches respectively.

20. The drill of claim 12, wherein said protective cover detachably mountable to said first or said second end of said power head, said protective cover is at least of sufficient length to cover said first chuck when positioned on said first end of said power head and to cover said second chuck when positioned on said second end of said power head.

21. The drill of claim 20, wherein said protective cover is adapted to cover said first chuck and a bit held in said first chuck and to cover said second chuck and a bit held in said second chuck.

22. The drill of claim 20, wherein said selector switch comprises at least two electrical contacts in said first end and at least two contacts in said second end of said power head, said contacts in said first end of said power head electrically connectable by a conductive element in said protective cover when said protective cover is positioned on said first end of said power head and said contacts in said second end of said power head electrically connectable by a conductive element in said protective cover when said protective cap is positioned on said second end of said power head.

23. The drill of claim 12, wherein said protective cover is adapted to cover said first chuck and a bit held in said first chuck when slid to said first end position and to cover said second chuck and a bit held in said second chuck when slid to said second end position.

24. The drill of claim 12, wherein said selector switch comprises first end, center and second end contacts disposed along said longitudinal axis of said power head, said center contact disposed between said first and second end contacts, and wherein said first end contact and said center contact are electrically connectable by a conductive element in said protective cap when said protective cover is slid to said first end position and second end contact and said center contact are electrically connectable by a conductive element in said protective cover when said protective cap is slid to said second end position.

25. The drill of claim 12, wherein said first chuck and said second chuck are independently selected from the group consisting of keyed chucks, keyless chucks and chuckless bit holders.

26. The drill of claim 12, further including a battery mountable in said handle.

27. The drill of claim 12, wherein said drive motor is a DC or an AC motor.

28. The drill of claim 12, wherein power to said drive motor is supplied by a power cord connectable to an external power supply.

29. The drill of claim 12, further including first trigger position locking means on a first side of said handle and second trigger position locking means on an opposite second side of said handle, said first trigger position locking means locking the position of said first trigger switch and said second trigger position locking means locking the position of said second trigger switch.

* * * * *

UNITED STATES PATENT AND TRADEMARK OFFICE

CERTIFICATE OF CORRECTION

PATENT NO. : 7,066,692 B2
APPLICATION NO. : 10/346237
DATED : June 27, 2006
INVENTOR(S) : Kuhn It is certified that error appears in the above-identified patent and that said Letters Patent is hereby corrected as shown below:

Column 1
Line 22, delete “a” and insert -- has --
Line 36, delete “invention a” and insert -- invention is a --

Column 2
Line 35, delete “and” and insert -- an --

Column 6
Line 49, delete “is and end” and insert -- is an end --
Line 54, delete “us” and insert -- is --

Column 7
Line 65, delete “cap” and insert -- cover --

Column 8
Lines 1, 9, and 12, delete “cap” and insert -- cover --

Column 10
Lines 3 and 19, delete “cap” and insert -- cover --

Signed and Sealed this

Twelfth Day of December, 2006

JON W. DUDAS
*Director of the United States Patent and Trademark Office*

UNITED STATES PATENT AND TRADEMARK OFFICE
CERTIFICATE OF CORRECTION

PATENT NO. : 7,066,692 B2
APPLICATION NO. : 10/346237
DATED : June 27, 2006
INVENTOR(S) : Kuhn It is certified that error appears in the above-identified patent and that said Letters Patent is hereby corrected as shown below:

Column 1
Line 22, delete "a" and insert -- has --
Line 36, delete "invention a" and insert -- invention is a --

Column 2
Line 35, delete "and" and insert -- an --

Column 6
Line 49, delete "is and end" and insert -- is an end --
Line 54, delete "us" and insert -- is --

Column 7
Line 65, delete "cap" and insert -- cover --

Column 8
Lines 1, 9, and 12, delete "cap" and insert -- cover --

Column 10
Lines 3 and 19, delete "cap" and insert -- cover --

This certificate supersedes Certificate of Correction issued December 12, 2006.

Signed and Sealed this

Ninth Day of January, 2007

JON W. DUDAS
*Director of the United States Patent and Trademark Office*